June 13, 1967 — R. HAILSTONE ET AL — 3,324,924
RADIANT HEATING DEVICES
Filed March 22, 1965 — 2 Sheets-Sheet 1
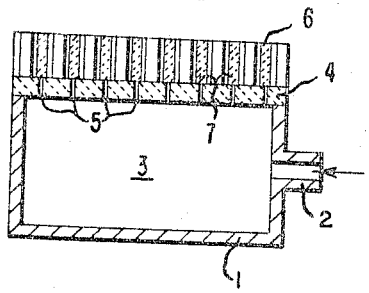
FIG. 1  FIG. 2
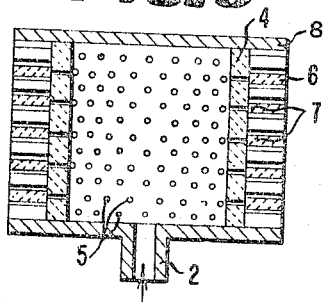
FIG. 3  FIG. 4
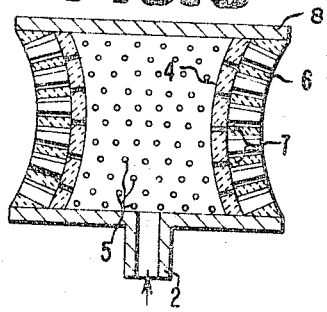
FIG. 5  FIG. 6
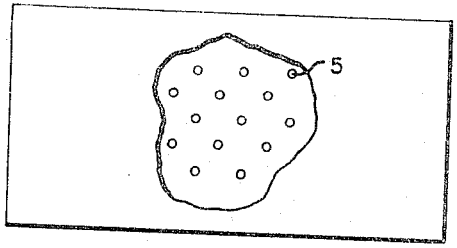
FIG. 7  FIG. 8
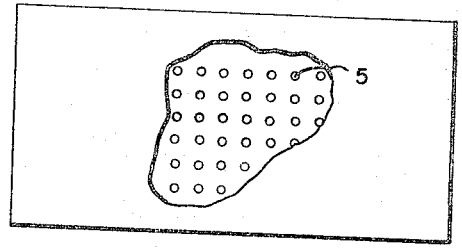
INVENTORS
ROGER HAILSTONE
DONALD MAURICE SOWARDS
VERNE WESLEY WEIDMAN
BY *Albert B. Grigg*
ATTORNEY

INVENTORS
ROGER HAILSTONE
DONALD MAURICE SOWARDS
VERNE WESLEY WEIDMAN

United States Patent Office 3,324,924
Patented June 13, 1967

3,324,924
RADIANT HEATING DEVICES
Roger Hailstone, Wilmington, Donald Maurice Sowards, Claymont, and Verne Wesley Weidman, Wilmington, Del., assignors to E. I. du Pont de Nemours and Company, Wilmington, Del. a corporation of Delaware
Filed Mar. 22, 1965, Ser. No. 441,518
16 Claims. (Cl. 158—99)

This invention relates to a radiant gas burner and is more particularly concerned with such a burner having as a radiant element a honeycomb-shaped refractory structure.

Most radiant gas burners on the market today consist of three basic components: a gas distributor plate made from ceramic material and having channels through which air/gas mixtures pass; a heat-resistant metal radiation grid placed parallel to and a short distance from the distributor plate; and a combustion zone between the radiation grid and the distributor plate. The gases burn on the outer surface of the distributor plate. The channels in the distributor plate are sufficiently small to prevent blowback, i.e., propagation of the flame back through the channels in the plate to the incoming gases. The plate also serves to insulate incoming gases from the combustion zone. The radiation grid intercepts the heat produced by combustion of the gases and converts it into radiative heat. The grid is formed over its working area with openings which permit the escape of the combustion products. In addition, the grid provides a surface for combustion of incompletely-burned gas utilizing ambient air.

Radiant gas burners of the type described are limited as to the temperature at which they can be operated due to the use of a metal radiation grid. Normally such burners are operated at maximum temperatures of about 900° C. in order to prevent oxidation and warping of the metal radiants which occur at higher temperatures. Since radiant flux density is proportionate to the fourth power of absolute temperature of the radiating surface, it is apparent that a burner which could be operated at higher temperatures would be desirable. Ceramic refractory materials which can withstand higher temperatures are not generally acceptable for use as radiant elements due to the low emissivity of these materials. For example, the emissivity of alumina at a temperature of 1500° C. is in the range of only about 0.2 to 0.4.

A further characteristic of these radiant gas burners is that radiation from the surface of the metal grid is scattered hemispherically in front of the burner. While this may not be a drawback for certain applications, as where the burner is to be used as a space heater, it is a distinct disadvantage where it is to be used for heating a specific object.

It has heretofore been proposed to use a honeycomb-shaped refractory structure or other cellular structure constructed from a refractoy material as the radiant element in a gas burner. For example British Patent 931,096, published July 10, 1963, mentions the use of various cellular ceramic structures as burner blocks for radiant gas burners. U.S. Patent 3,088,271 issued May 7, 1963, also mentions cellular ceramic structures for use as radiants and U.S. Patent 3,112,184 issued Nov. 26, 1963, discloses ceramic honeycomb-shaped article and suggests that they can be used as radiators. However, none of these references contains a disclosure of a specific burner design which is operable over a wide rang of gas inputs. The problem in designing such burners has been the tendency of the flame to "blow off" the surface of the honeycomb radiant at high inlet gas velocities and to "blow back" or flash back to the incoming gases at low inlet gas velocities.

According to this invention there is provided a radiant gas burner having as a radiant element a honeycomb-shaped ceramic structure. The burner is of simple design and is stable in operation over a wide range of gas inputs. Use of a radiant element constructed of a highly refractory ceramic material permits the burner to be operated at temperatures greatly in excess of those permissible with burners having metal grid radiants. Further, the design of the burner is such that burning takes place and the flame is contained deep in the cells of the honeycomb structure. Where the ratio of honeycomb cell length to diameter is sufficiently high, conditions approaching that of a "black" body, i.e., emissivity approaching unity, will result. Since heat transfer by radiation is proportionate to the product of emissivity and the fourth power of absolute temperature, radiant transfer from the honeycomb structure is highly effective. A further advantage of the use of the honeycomb radiant lies in the collimating effect it has on radiation. Where the ratio of honeycomb cell length to diameter is sufficiently large, the radiation leaves the surface of the honeycomb in a direction approaching the parallel with the major axes of the cells. Thus loss of efficiency due to scattering of the radiation from the burner is effectively minimized.

A further advantage of the burner of this invention lies in the multiplicity of combustion zones corresponding to the cells of the honeycomb structure as opposed to one large combustion zone associated with conventional units. One beneficial result of this feature is that the burner is protected from cross-currents of cold air which would be liable to cause flame blowout in units having a single large combustion zone. Separating the combustion zones also provides a very large surface for converting the convective heat produced by the burning gases to radiative heat. A further advantage of separate combustion zones is that, since all surfaces catalyze combustion at elevated temperatures, the large surface area in the combustion zones promotes highly efficient combustion of gases, thus adding to the overall efficiency of the burner.

Further advantages resulting from the unique design of the burner of this invention will become apparent as the description proceeds.

The gas-fired radiant heater of this invention comprises:

(A) as a radiant element, a ceramic, refractory open-cell honeycomb-shaped structure;
(B) an injector plate comprising a sheet of ceramic material, said plate being so arranged that one surface is adjacent to one end of each cell of the honeycomb structure, and having holes distributed evenly over the portion of its surface in contact with the honeycomb structure;
(C) a gas distribution chamber having at least a portion of its defining wall consisting of said injector plate, and being fitted with means for the introduction of a mixture of gas and air.

The components of the burner are arranged in such a way that an air/gas mixture entering the gas distribution chamber will pass from the chamber through the holes in the injector plate into the cells of the honeycomb structure.

In the drawings:

FIGURE 1 is an elevation in section of a typical gas-fired radiant burner of this invention using a planar honeycomb structure.

FIGURE 2 is a partially sectional plan view of the burner of FIGURE 1.

FIGURE 3 is an elevation in section of a gas-fired radiant burner of this invention using a cylindrical honeycomb structure. The honeycomb cells in this embodiment are substantially radial to the axis of the structure.

FIGURE 4 is a partially sectional plan view of the burner of FIGURE 3.

FIGURE 5 is an elevation in section of a radiant gas burner of the invention using a honeycomb structure having the general shape of a cylinder, the walls of which are convex with respect to the axis of rotation of the cylinder.

FIGURES 6, 7, and 8 illustrate various possible arrangements of the holes or channels in the injector plate used in the burner of this invention.

Figure 9:
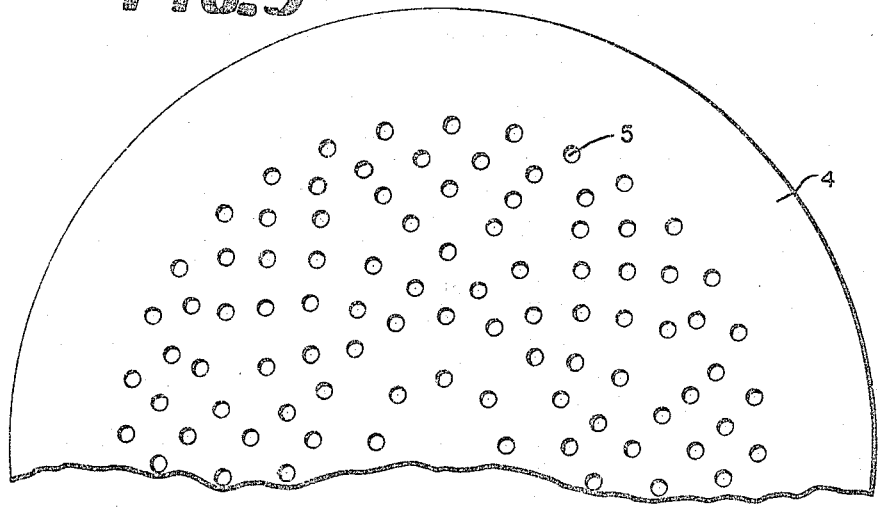

FIGURE 9 shows a possible configuration of the holes in the injector plate of an embodiment of this invention having a circular honeycomb structure.

Figure 10:
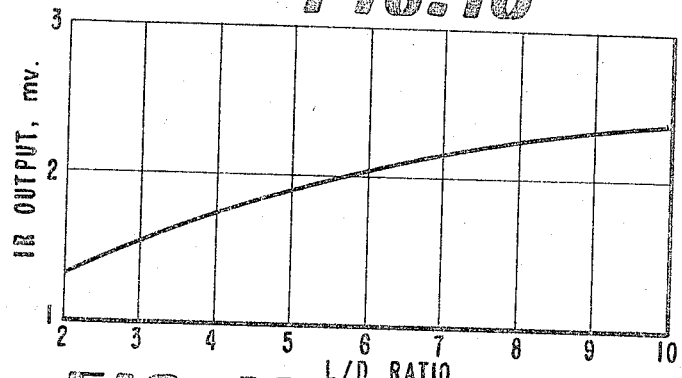

FIGURE 10 is a plot of infrared output vs. honeycomb cell length-to-diameter ratio for a burner such as that illustrated in FIGURE 1.

Figure 11:
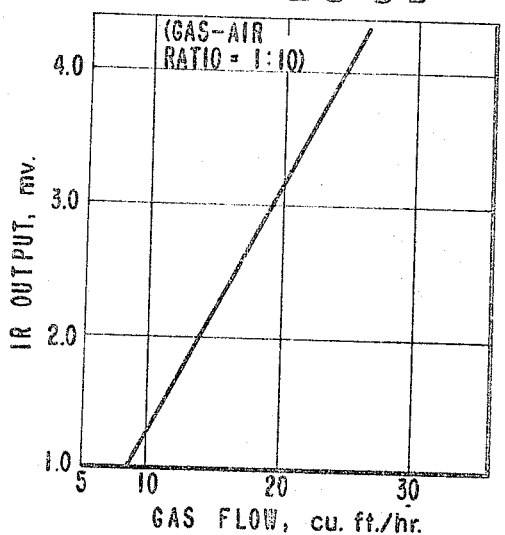

FIGURE 11 is a plot of infrared output vs. gas input for a particular embodiment of the burner of this invention operating with a constant gas-air volume ratio of about 1:10.

Referring now more specifically to FIGURES 1 and 2 of the drawings, the burner is shown as comprising a housing 1, connections 2 for supplying a combustible mixture of gas and air to the distribution chamber 3, an injector plate 4 consisting of a sheet of refractory ceramic material containing holes or channels 5 over the portion of its surface which is in contact with a planar section of a honeycomb-shaped refractory structure 6. The injector plate 4 forms a portion of the defining wall of the gas distribution chamber 3. The outer surface of the injector plate 4 is adjacent to one end of each cell of the honeycomb structure 6. In operation a mixture of air and gas is introduced at 2 into the distribution chamber 3 and passes through the injector plate 4. Combustion of the gases takes place in regions 7 near the base of each cell which is in contact with a hole of the injector plate. The velocity of the air-gas mixture as it passes through the holes 5 in the injector plate 4 is increased to such an extent that the flame is not propagated back through the holes to the incoming gases in the distribution chamber 3. The rapidly changing cross-sectional area as the gases leave the holes of the injector plate and enter the cells of the honeycomb produces a high degree of turbulence which help to confine the flame to the base of the cells. The material of the injector plate should be of sufficiently low thermal conductivity to prevent overheating of the gases in the distribution chamber and consequent flashback and yet permit some preheating of the incoming gases.

FIGURES 3 and 4 illustrate another embodiment of the burner of this invention. In this embodiment the honeycomb structure 6 is in the form of a cylinder. The injector plate 4 is also in the form of a cylinder, the outer surface of which is adjacent to the inner surface of the cylindrical honeycomb structure. The gas distribution chamber 3 is defined by the inner surfaces of the injector plate 4 and cover plates 8. Combustible mixtures of gas and air are introduced into the distribution chamber through the connection 2. The operating characteristics of this burner are similar to those of the burner illustrated in FIGURE 1.

FIGURE 5 illustrates a variation in the embodiment shown in FIGURES 3 and 4 in which the walls of the cylindrical honeycomb structure 6 are convex with respect to the axis of rotation of the cylinder so that the axes of all honeycomb cells are approximately aligned to a circle surrounding the burner.

Methods for making the honeycomb structures used as radiant elements in the burner of this invention are known in the art. One suitable method is disclosed in British Patent 931,096. This method comprises forming a plasticized raw material mix containing finely divided sinterable particles of a refractory material, plasticizing ingredients and volatile viscosity adjustment media into a thin film or sheet material. The sheet material is then corrugated and honeycomb structures are fabricated by placing sheets together so that the nodes of one sheet are in contact with nodes of another corrugated sheet or with a non-corrugated sheet. The structure is then fired to sintering temperatures. Examples of sinterable materials which can be used are alumina, zirconia, cordierite, zircon, barium titanate and magnesia.

Another suitable method for making the honeycomb structures is disclosed in U.S. Patent 3,112,184. In this method a suspension containing pulverized ceramic material and a binder is coated on each side of a flexible carrier. The carrier is corrugated and the corrugated material is used to fabricate honeycomb structures. The green structure is then fired to sinter the ceramic particles. As described in the patent the purpose of the carrier is to provide support for the unfired coating to allow it to be formed to the desired shape prior to the firing step. The carrier can be either an inorganic or organic material although the latter are preferred since they burn out on firing and not appear in the final product. Also preferred for use as carriers according to this method are fibrous materials containing a multitude of holes which pass through the carrier from one surface to the opposite surface and which can be completely filled by the ceramic slurry to produce an unlaminated wall upon firing.

A particularly suitable method for making the honeycomb structures is that disclosed in Belgian Patent 612,535 issued July 11, 1962. In this method aluminum foil is fabricated into a honeycomb structure of the desired shape and is fired under controlled conditions to oxidize the aluminum to alpha alumina. Prior to the firing step the aluminum foil is coated with an agent, identified in the patent as a fluxing agent, which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e., compounds which yield the oxides on firing. A particularly suitable agent is sodium oxide which is applied as sodium silicate.

The honeycomb products resulting from this process are substantially pure alpha alumina. If desired, the chemical composition of the structures can be modified by including in the coating composition finely divided particles of filler refractory oxide. The filler refractories may if desired, be one or more of those which will react with the alumina as it is formed. If a reactive filler such as magnesia and/or silica is used, the honeycomb structure will contain the corresponding reaction product such as spinel, cordierite or mullite. The products of this process are characterized by outstanding strength and thermal shock resistance.

As disclosed in the Belgain patent the honeycomb structures may be fabricated by corrugating sheets of aluminum foil coated with fluxing agent and placing the coated sheets together node to node. Where sodium silicate solution is used as the fluxing agent, the body will have sufficient green strength to maintain its shape until it is fired. Alternatively the honeycomb structure may first be fabricated from the aluminum foil using methods well known in the art and described in the patent literature. Suitable prefabricated aluminum honeycomb structures for use in this process are available commercially and may be purchased from Hexcel Corporation or Bloomingdale Rubber Division of American Cyanamid, both of Havre de Grace, Md.

An improvement in the process for making honeycomb structures by the method of the Belgain patent is disclosed in copending U.S. application S.N. 367,856 filed May 15, 1964, and assigned to the assignee of the present application. In the process of this application the composition used to coat the aluminum honeycomb structure contains, in addition to the fluxing agent and filler refractory, if any, small amounts of a vanadium compound. The products of the Belgian patent are characterized by having a double-walled structure. The double-wall results from the fact that the aluminum foil, as it melts, flows outwardly through the oxide formed on the outer surfaces of the foil and is oxidized at the outer surface of the oxide layer, thus leaving a large void in the final product corresponding approximately in thickness to the thickness of the original aluminum foil. The inclusion of the vanadium compound in the coating composition causes the formation of bridges of refractory material between these double walls, resulting in a product having even greater strength and thermal shock resistance than the products of the Belgian patent.

The structural design parameters for the honeycomb radiant elements are the diameter of the cells, the thickness of the walls of the cells, and the ratio of length to diameter of the cells.

The diameter of the cells of the honeycomb is not particularly critical and can vary within wide limits. As a practical matter, the diameter will range between about 1/16" and 3/8". Structures with smaller cell diameters can be used but are more difficult to fabricate. Moreover, with cells of smaller diameter the change in cross-sectional area in passing from the holes of the injector plate to the cells of the honeycomb may not be sufficiently great to reduce the velocity of the gas to the extent necessary to prevent the flame from leaving the base of the cells and blowing off the face of the radiant, without the use of extremely small holes in the injector plates. Similarly, structures having cells larger than about 3/8" can be used but are ordinarily not desirable simply because they become too bulky for convenient use. As will be discussed below, it is desirable that the structure have a cell length-to-diameter ratio in the range of about 8:1 in order to provide efficient collimation of the radiation and in order to provide conditions approaching that of a "black" body. Thus where the cell diameters are greater than about 3/8 of an inch the thicknesses of the structure required to provide the desired length-to-diameter ratio will be so great as to make the structure too bulky for ease of handling and installation. Larger sizes will ordinarily not be preferred for use for the further reason that as the cell diameters increase the unit becomes more susceptible to flame blow out by cold drafts.

The range of cell diameters given above are the norminal sizes, i.e., ignoring the wall thickness. It is perhaps more accurate to say that, as a practical matter, the number of cells per inch will range from a lower limit of about 2⅔ cells per inch to a maximum of about 16 cells per inch. Wall thicknesses will vary from a minimum of about 0.010 in. where a honeycomb structure having 16 cells per inch is used to a maximum of about 0.10 in. where a honeycomb structure having 2⅔ cells per inch is used. Of course the wall thickness in a honeycomb structure having 16 cells per inch can be greater than the minimum stated but it should be less than that necessary to provide a structure having an open area normal to the cell axes of at least about 40%. Similarly the wall thickness in a structure having 2⅔ cells per inch can be less than the maximum but the thickness must be great enough to provide a structure with a maximum open area normal to the cell axes of about 95%.

As indicated above the ratio of cell length to diameter in the honeycomb-shaped radiant elements is an important design factor. It is well known that the effective emissivity of a cavity such as a honeycomb cell approaches unity at the ratio of the length to the diameter of the cavity increases. In other words, the radiation characteristics of honeycomb cells approach those of a "black" body as the ratio of length to diameter increases. This relationship is shown in FIGURE 10 of the drawings which is a plot of the results obtained in Examples 1 and 5 below. It will be seen that at identical B.t.u. input and other operating conditions the output of radiant heat energy translated into electrical energy almost doubled on increasing the length-to-diameter ratio from 2:1 to 10:1.

The material used for the injector plate can be any refractory ceramic product. As mentioned above the material used should have sufficient insulating properties to prevent over-heating of the incoming gases and their premature ignition in the distribution chamber. At the same time it is desirable that the conductivity of the material be sufficiently high to permit some preheating of the incoming gases. Thus it is desirable that the material used have a thermal conductivity in the range of about 3–4 B.t.u.(hr.)$^{-1}$(° F.)$^{-1}$(ft.$^2$/in.)$^{-1}$. Many materials meeting these specifications are available commercially. One such suitable material is Harbison-Walker No. 28 insulating brick. Another suitable material is a refractory fiber felt or batt such as "Fiberfrax" manufactured by the Carborundum Company or "Cerabelt" manufactured by Babcock & Wilcox Company.

The thickness of the injector plate is not particularly critical but will depend to some extent upon the thermal conductivity of the material used, greater thicknesses in general being used with a more highly conductive material.

The number, diameter and spacing of the holes in the injector plate should be such that the gas/air velocity through the jets will range from about 5 to about 50 ft. per second. At lower gas velocities there is a tendency for flashback and ignition of the gases in the gas distribution chamber to occur. At higher velocities it is difficult to confine the combustion to the base of the honeycomb cells and there is a tendency for the flame to blow off the surface of the honeycomb radiant.

Gas/air velocities in the upper end of the operable range are not preferred for the reason that flame velocity at room temperature is low and in starting up the flame does not withdraw readily into the honeycomb cells. Thus extended warm-up periods are encountered at the upper end of the gas velocity range. Gas/air velocities in the range of about 10 to about 25 ft. per second are preferred.

The holes should preferably not be larger than about 1/8" in diameter. Larger holes can be used but as the size of the holes increases, of course, the number of holes decreases in order to provide a gas velocity in the desired range for a given gas through-put. The fewer the holes, the greater the separation between holes. When the separation between the holes becomes too great the honeycomb radiant does not heat evenly. Instead the radiant heats in the region of each jet causing a "patch-work" effect. In addition the volume of gas/air mixture passing through each jet per unit time becomes too great for effective combustion to take place within the cells since the cell surface per unit volume of gas per unit of time is too low.

It will be apparent from the above discussion that effective operation of the burner does not require one jet for every honeycomb cell. However, the number of holes should be sufficient to provide even heating of the radiant element. It has been found that the injector plate should contain at least about 2 and preferably at least about 4 holes for each square inch of its surface in contact with the honeycomb structure. For a burner having an injector plate with at least about 2 holes per square inch, no visible difference is observed between cells connected to jets (i.e., holes) and "dead" cells. However, in the case of a burner operating with 1/8" diameter jets set on 1/2" spacing as shown in FIGURE 7, the relatively large separation of the holes causes a drop in infrared output.

There is actually no lower limit on the size of the holes so long as the number is sufficient to keep the velocity of the gas/air mixture through the holes within the range of 5 to 50 ft. per second. However, as a practical matter, perfectly satisfactory operation has been achieved with holes having a diameter of 0.035 inch and it is believed that no advantage would be gained by the use of smaller holes which would be sufficient to warrant the added expense of drilling such holes.

The arrangement of the holes is not particularly critical but they should be evenly distributed and preferably arrayed in a more or less uniform geometrical pattern to insure uniform heating of the honeycomb radiant. Possible configurations which have been successfully used in various embodiments of the burner of this invention are shown in FIGURES 6, 7, 8, and 9 of the drawings.

The ratio of gas to air in the fuel for the radiant gas burner of this invention is not critical and can vary within wide limits. Experience has shown that the optimum gas/air ratio is approximately 1:10. The optimum conditions can be achieved by observing visually the region immediately in front of the radiating surface. If there is a slightly luminous flame in front, more air is needed. Optimum conditions occur when the luminous flame is just on the point of disappearing as a result of adding more air.

As stated above, the burner of this invention is stable in operation over a wide range of gas/air feed rates. This is illustrated in FIGURE 11 of the drawings, which shows the linear relationship between gas input and infrared energy output for the burner of Example 1 below. The data resulted from operation of the burner over a range of gas feed rates varying from 10 to 25 cubic feet per hour. The gas/air volume ratio was maintained constant at the optimum value of about 1:10.

Efficiency, defined as the ratio of radiant heat leaving the burner to the calorific value of the gas entering the burner, is in the range of about 45% at 62,000 B.t.u.(hr.)$^{-1}$(ft.$^2$)$^{-1}$ input for a typical design of the burner of this invention, as determined by calorimetric measurements. Efficiency, taking into account convective as well as radiant heat output, is in the range of about 60 to 70% for the example measured.

The material used in the housing of the gas distribution chamber is not critical since this portion of the burner is not subjected to high temperatures. Stamped sheet steel is satisfactory.

The burner of this invention is useful for space heating and for other domestic and industrial heating applications. A burner having a cylindrical radiant surface such as that shown in FIGURES 3 and 4 affords a band of radiation that extends in a 360° arc from the axis of the burner with a height corresponding substantially to the length of the honeycomb cylinder along the axis of the burner. Such a burner is particularly useful as a space-heater. The arc of radiation can be effectively focused on a line or narrow band surrounding the burner by using a cylindrical honeycomb radiant having walls convex to the axis of rotation of the cylinder such as that shown in FIGURE 5. Such a device can be used to weld the interior of pipes. The burners with curved radiants are particularly adapted for heating and lighting purposes due to the aesthetic qualities of the design and the many possible variations.

The refractory radiant can be modified by the presence of suitable substances to alter the wave length of the radiation from those normally emitted by the refractory at a given temperature. Thus the radiant can be designed for specific end uses such as providing visible light. Compounds of zirconium, cerium, thorium, manganese, copper, cobalt, calcium, barium, strontium, lithium, sodium, potassium and the like can be used for this purpose. The substances can be coated on the fired radiant or can be included as a component of the unfired structure.

The invention will be further illustrated by the following examples.

Example 1

A 6″ x 4″ x ¾″ slab of Harbison-Walker No. 30 insulating brick is drilled to provide 150 holes of 0.07 in. diameters arranged with the ½″ staggered spacing illustrated in FIGURE 7. The drilled piece is then cemented onto the front of a ¾″ FS-23 (Crous-Hinds) "Condulet" electrical junction box. Into this box a 12″ length of ½″ I.P.S. black iron pipe is inserted which serves as an air/gas mixing tube. Separate air and gas supplies to the mixing tube are regulated by needle valves. The injector plate is affixed to the junction box using A.P. Green No. 36 cement. A 6″ x 4″ piece of ⅛″ nominal cell diameter honeycomb with cell depth of 1″ is then cemented, again using A.P. Green No. 36 cement, onto the front of the injector plate. An effective seal between the injector plate and the metal and between the honeycomb and injector plate is obtained.

The burner so constructed is mounted so that the radiating surface (i.e. honeycomb) is vertical and is operated as follows: natural gas (calorific value=about 1040 B.t.u./cu. ft.) at the rate of 15.5 c.f.h. and air at the rate of 152 c.f.h. are introduced into the mixing tube. The mixture enters the gas distribution chamber formed by the electric junction box and passes through the holes of the injector plate into the cells of the honeycomb section. The velocity of the gas/air mixture through the holes is 11.6 f.p.s. The gas is ignited at the surface of the honeycomb element. The flame recedes to the base of the cells of the honeycomb. As the temperature increases the radiant begins to glow and presently becomes almost white hot.

The infrared output of the burner is measured using an equipment train consisting of (1) a Minneapolis Honeywell Co. "Radiamatic" sensing head, (2) a controller to provide a constant cold junction temperature, and (3) a recording potentiometer. The sensor is covered by a blackened aluminum foil shield which converts to heat the infrared energy absorbed on its surface. The heat so generated is measured by a thermopile in the sensor element, the output fed into the system as electrical energy and the product read out on the recorder as millivolts. Convective heat is separated from infrared energy by simply providing sufficient distance between the radiant and the sensing head. A separation of 12 inches is suitable.

Under these conditions the infrared output for the burner described is recorded as 2.28 millivolts which corresponds to a radiant heat input to the sensing head of about 425 B.t.u. per hour. The operating temperature of this burner as measured by an optical pyrometer is 1525° C. The honeycomb structure used in the burner of this example is prepared as follows:

An aluminum honeycomb composed of Aluminum Alloy 5052 (2.5% magnesium-0.25% chromium) is purchased from the Hexcel Corporation. This honeycomb has a wall thickness of about 3 mils and an open area transverse to the cell axes of about 95%.

The aluminum honeycomb is etched in dilute (3:1) hydrochloric acid until the metal acquires a dull surface, i.e., about 20 minutes exposure time.

The aluminum honeycomb is treated with a coating of the following composition:

| | G. |
|---|---|
| Carboxymethyl cellulose | 10 |
| Sodium (meta) vanadate | 100 |
| Water | 1000 |
| Sodium silicate (Baker & Adams Technical 40° Bé. solution; 38% sodium silicate) | 1000 |
| Aluminum dust (Metals Disintegrating Company, 98.38% aluminum) | 3000 |

The etched honeycomb pieces are immersed in the coating suspension and withdrawn slowly to facilitate drainage. All cells are blown with air to remove excess suspension and samples are dried with forced air circulation. This coating and drying process is repeated three times to obtain the desired wall thickness.

The coated, dried honeycomb is then clamped between the platens of a press and exposed to a pressure of about 1 p.s.i. and a temperature of 200–250° C. The heat setting treatment is repeated after each application of coating in an effort to minimize distortion of the fired product.

The coated honeycomb is then fired in a gas-fired furnace using the following cycle—

| Cumulative time, hrs.: | To attain temperature, °C. |
|---|---|
| 22.5 | 860 |
| 48 | 1010 |
| 70 | 1200 |
| 79 | 1270 |
| 93 | 1415 |
| 118 | 1600 |

The product is a strong, rigid honeycomb composed principally of alpha alumina with traces of mullite. The wall thickness varies from about 0.030 to about 0.050 in. The peripheral surface area is about 30–40 sq. in./in.$^3$. The open area transverse to the cell axes is about 50–60% and the bulk density is about 40 lb./ft.$^3$.

*Example 2*

A burner is constructed as shown in Example 1 except that the injector plate is drilled with 77 holes of 0.07 inch diameters arranged on a ½" spacing as shown in FIGURE 6. The gas/air mixture is fed to this burner at the same rate as in Example 1 so that the velocity of the fuel through the holes of the injector plate is 22.7 f.p.s. This burner provides satisfactory operation but it is slow in warming up due to the fact that the flame does not withdraw readily into the honeycomb cells. As the flame temperature rises, however, the flame does recede into the honeycomb cells. After stable operation has been achieved, the output of the radiant burner is measured as 2.0 millivolts, which corresponds to a radiant heat input to the "Radiamatic" sensing head of about 400 B.t.u. per hour.

*Example 3*

A burner is constructed as described in Example 1 except that the injector plate is drilled with 273 holes of 0.035 inch diameters with a ¼" hole spacing as shown in FIGURE 8. The gas/air mixture was fed to the burner at the same rate as in Example 1 giving a velocity through the holes of the injector plate of 26.5 f.p.s. This burner provides satisfactory operation. The infrared output from the burner is measured at 2.3 millivolts or approximately 425 B.t.u. per hour radiant heat input to the "Radiamatic" sensing head.

*Example 4*

A burner is constructed as described in Example 1 except that the injector plate is drilled with 50 holes having 0.125 inch diameters set on ½" placing as shown in FIGURE 6. Fuel is fed to the burner at the same rate as in Example 1 providing a velocity through the holes of the injector plate of 10.9 f.p.s. No visual difference between the radiating surface of this burner and that of Example 1 is observed. However, the relatively large separation between the ⅛" diameter holes of the injector plate apparently causes a drop in infrared output which is measured at 1.65 millivolts, corresponding to a heat input to the "Radiamatic" sensing head of about 380 B.t.u. per hour.

*Example 5*

A series of three burners are constructed exactly as described in Example 1 except that the thicknesses of the honeycomb structure having ⅛" nominal cell diameters are ¼", ¾" and 1¼". Thus the cell length-to-diameter ratios for these three burners are 2:1, 6:1 and 10:1 respectively. The burners are operated exactly as described in Example 1. All three burners provide satisfactory operation. The infrared output from the burner having a cell length-to-diameter ratio of 2:1 is 1.33 millivolts. The output from the burner having a cell length-to-diameter ratio of 6:1 is 1.90 millivolts and the output from the burner having a cell length-to-diameter ratio of 10:1 is 2.40 millivolts. These data and the measurement from Example 1 are shown graphically in FIGURE 11 of the drawings.

*Example 6*

A burner is constructed as described in Example 1 except that the honeycomb structure used has a nominal cell diameter of ¼", providing a cell length to diameter ratio of 4:1. The burner is operated under the conditions described in Example 1 and provides an infrared output as measured by the "Radiamatic" sensing head of 1.84 millivolts, or about 388 B.t.u. per hour.

*Example 7*

A burner is constructed as described in Example 1 except that a honeycomb structure having a nominal cell diameter of ⅜" and having a thickness of 2" is used. The cell length-to-diameter ratio in this honeycomb structure is therefore 5.33:1. The burner is operated under the conditions described in Example 1. The infrared output from this burner is measured at 1.95 millivolts or about 395 B.t.u. per hour radiant heat input to the sensing head. The temperature of this burner as measured with an optical pyrometer is 1460° C.

*Example 8*

The burner of Example 1 is operated at various gas input rates varying from 10 to 25 cubic feet per hour with a constant gas/air ratio of approximately 1:10. The infrared output of the burner is measured at each gas flow rate. The data obtained are shown graphically in FIGURE 11. The relationship between fuel input and radiant output is linear in the range shown.

*Example 9*

A burner is constructed utilizing a 6" O.D. cylindrically shaped honeycomb radiant (⅛" cell; cell length-to-diameter ratio of 8:1) supported by a 6" diameter by ¾" thick disc of insulating refractory drilled in the center to accommodate the exit end of a 12" length of black iron pipe, which serves as a gas/air mixing tube. Similarly, a 6" diameter disc of insulating refractory is used to cover the top of the round honeycomb radiant. This burner is equipped with a cylindrically shaped insulating refractory injector plate located immediately behind and within the circular honeycomb radiant. The operation of this burner is similar to that described in Examples 1 through 8 except that in this configuration, infrared energy is emitted over 360° of arc and over the full height of the circular honeycomb structure, in this case 2 inches.

*Example 10*

A burner is constructed as described in Example 9 except that the cylindrically shaped honeycomb radiant is considerably taller. Employing the same apparatus for mixing and introducing the combustible gas/air mixture this particular configuration again emits radiant energy over 360° of arc but spanning a height of 6 inches. The radiant energy emitted from a burner of this size not only provides a significant output of heat, but light as well.

*Example 11*

A large planar burner is constructed similar to the smaller burner described in Example 1 except that the radiant exceeds one square foot of area, i.e., dimensions of 24" long x 7" wide. The injector plate positioned immediately behind the refractory honeycomb is drilled with 0.07" diameter holes arrayed on ½" staggered pattern. (See FIGURE 7.) The 1:10 natural gas to air mixture is introduced into a plenum (distribution chamber) on which the injector plate honeycomb combination is supported. Utilizing forced air, 100 c.f.h. of gas is burned per hour. This illustration demonstrates the feasibility of operation of honeycomb radiant burners exceeding one square foot in area.

Example 12

A burner is constructed as described in Example 11 except that aspirated air is employed in the operation of the burner. Although forced air normally is required for industrial applications because of the positive control that it provides, a forced air supply is impractical for many other applications, including domestic uses. By injecting the natural gas input through a jet and into a Venturi, air is aspirated to provide a suitable combustible mixture on entering the plenum (distribution chamber). This construction operates within very wide limits of gas supply, i.e., 30–150 c.f.h. for the 7″ x 24″ radiant burner surface. The successful operation of this air-aspirated burner demonstrates the versatility of operation that is possible with the honeycomb refractory radiant-injector plate combination.

The invention claimed is:

1. A radiant gas burner comprising:
    (A) as a radiant element, a ceramic, refractory open-celled honeycomb-shaped structure;
    (B) an injector plate comprising a sheet of a ceramic, refractory material said plate being arranged in such a way that one surface is in contact with one end of each cell of the honeycomb structure, and having holes distributed evenly over the portion of its surface which is in contact with the honeycomb structure to form a multiplicity of combustion zones, the number and size of said holes being such as to provide a gas/air velocity therethrough in the range of 5 to 50 feet per second for a given total gas and air mixture throughput;
    (C) a gas distribution chamber having at least a portion of its defining wall consisting of the surface of said injector plate which is opposite to the surface attached to the honeycomb structure and being fitted with means for the introduction of a mixture of said gas and air at said given throughput.

2. The radiant gas burner of claim 1 wherein the holes in the injector plate have a maximum diameter of about 0.125″ and the number of such holes is at least about 2 per square inch of injector plate surface in contact with the honeycomb structure.

3. The radiant gas burner of claim 2 wherein the holes in the injector plate are arranged in uniform geometric pattern.

4. The radiant gas burner of claim 2 wherein the number of cells in the honeycomb structure ranges from about 2⅔ to about 16 cells per linear inch and the percent open area of the honeycomb structure transverse to the cell axes ranges from about 40% to about 95%.

5. The radiant gas burner of claim 4 wherein the length-to-diameter ratio of the cells of the honeycomb is at least about 2:1.

6. The radiant gas burner of claim 4 wherein the length to diameter ratio of the cells of the honeycomb is about 8:1.

7. A radiant gas burner comprising:
    (A) as a radiant element, a ceramic refractory open-celled honeycomb-shaped structure, the number of cells of said structure ranging from about 2⅔ to about 16 per linear inch, the percent open area of said structure transverse to the cell axes ranging from about 40% to about 95%, the length-to-diameter ratio of the cells of said structure being at least about 2:1;
    (B) an injector plate comprising a sheet of a ceramic refractory material having a thermal conductivity in the range of about 3–4 B.t.u. (hr.)$^{-1}$ (°F.)$^{-1}$ (ft.$^2$/in.)$^{-1}$, said plate being so arranged that one surface thereof in contact with one end of each cell of the honeycomb structure, and having holes distributed evenly over the portion of its surface which is in contact with the honeycomb structure to form a multiplicity of combustion zones, the diameter of said holes being in the range of about .035 inch to 0.125 inch and the number of said holes being at least about 4 per square inch of injector plate surface in contact with honeycomb structure and being such as to provide a gas/air velocity therethrough in the range of about 10 to 25 feet per second for a given total gas and air mixture throughput;
    (C) a gas distribution chamber having at least a portion of its defining wall comprised by the surface of said injector plate which is opposite to the surface attached to the honeycomb structure, and being fitted with means for the introduction of a mixture of said gas and air at said given throughput.

8. The radiant gas burner of claim 7 wherein the radiant element is a planar section of said honeycomb-shaped structure.

9. The radiant gas burner of claim 8 wherein the ratio of length to diameter of the cells of said honeycomb structure is about 8:1.

10. The radiant gas burner of claim 9 wherein the honeycomb-shaped structure is made by the in situ oxidation of aluminum honeycomb.

11. A radiant gas burner comprising:
    (A) as a radiant element, a cylindrical open-celled ceramic refractory honeycomb-shaped structure, the cells of which are substantially radial to the axis of the cylinder;
    (B) an injector plate comprising a cylindrical sheet of a ceramic refractory material having a low thermal conductivity, said injector plate being of such size and being so arranged as to contact the inner surface of the cylindrical honeycomb structure and having holes distributed evenly over the portion of its surface which is in contact with the honeycomb structure to form a multiplicity of combustion zones, the number and size of said holes being such as to provide a gas/air velocity therethrough in the range of 5 to 50 feet per second for a given total gas/air mixture throughput;
    (C) a gas distribution chamber defined by (1) the inner surface of said cylindrical injector plate and (2) the inner surface of cover plates affixed to each end of said cylindrical injector plates, said chamber being fitted with means for the introduction of a mixture of gas and air.

12. The burner of claim 11 in which the walls of the cylindrical honeycomb-shaped structure are convex with respect to the axis of rotation of the cylinder.

13. The burner of claim 11 wherein the holes in the injector plate have a diameter in the range of about 0.035″ to 0.125″ and the number of such holes is at least about 4 per square inch of injector plate surface which is in contact with the honeycomb structure.

14. The burner of claim 13 wherein the number of cells in the honeycomb structure ranges from about 2⅔ to about 16 cells per linear inch and the percent open area of the honeycomb structure transverse to the cell axes ranges from about 40% to about 95%.

15. The burner of claim 14 wherein the length-to-diameter ratio of the cells of the honeycomb is about 8:1.

16. The radiant gas burner of claim 11 wherein said cylindrical honeycomb-shaped structure is made by the in situ oxidation of aluminum honeycomb.

References Cited

UNITED STATES PATENTS

| | | | |
|---|---|---|---|
| 1,308,364 | 7/1919 | Lucke | 158—99 |
| 3,044,538 | 7/1962 | Honger | 158—116 |

FOREIGN PATENTS

| | | |
|---|---|---|
| 464,692 | 8/1928 | Germany. |
| 905,481 | 9/1962 | Great Britain. |

JAMES W. WESTHAVER, *Primary Examiner.*